US008250413B2

(12) United States Patent
Alcorn et al.

(10) Patent No.: US 8,250,413 B2
(45) Date of Patent: Aug. 21, 2012

(54) CONNECTION BROKER ASSIGNMENT STATUS REPORTING

(75) Inventors: Byron A. Alcorn, Fort Collins, CO (US); Jeffrey Joel Walls, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 330 days.

(21) Appl. No.: 12/242,091

(22) Filed: Sep. 30, 2008

(65) Prior Publication Data

US 2010/0083032 A1    Apr. 1, 2010

(51) Int. Cl.
*G06F 11/00* (2006.01)
(52) U.S. Cl. .............. 714/47.1; 714/49; 714/57
(58) Field of Classification Search .......... 714/15, 714/57, 25, 46, 47.1, 48, 49
See application file for complete search history.

(56) References Cited

U.S. PATENT DOCUMENTS

| 6,964,006 B2 * | 11/2005 | Aoki et al. ............ 714/784 |
| 2005/0138204 A1 * | 6/2005 | Iyer et al. .............. 709/242 |
| 2009/0028117 A1 * | 1/2009 | Goulet et al. .......... 370/338 |
| 2009/0094596 A1 * | 4/2009 | Kuiper et al. .......... 717/174 |
| 2009/0113058 A1 * | 4/2009 | Ou et al. ................. 709/227 |
| 2009/0276667 A1 * | 11/2009 | Dopson et al. ......... 714/48 |

* cited by examiner

*Primary Examiner* — Scott Baderman
*Assistant Examiner* — Sarai Butler

(57) ABSTRACT

In one embodiment a computing system comprises one or more processors, a display device coupled to the computing system, and a memory module communicatively connected to the one or more processors. The memory module comprises logic to receive, in a connection server, a service request from a user via a remote connection client; in response to the service request, instantiate a remote computing protocol in a computing resource, monitor a connection state between the remote connection client and the computing resource; and in response to a change in the connection state between the remote connection client and the computing resource, generate a connection state message, and transfer the connection state message to the remote connection client.

18 Claims, 4 Drawing Sheets

CONNECTION BROKER ASSIGNMENT STATUS REPORTING

BACKGROUND

Remote software systems provide connections between one or more client computing devices and one or more applications executing on a processing device that is physically remote from the client computing device. In some implementations the client computing device may be embodied as a thin client, while in other implementations the client computing device may be embodied as a fully equipped computing device. In some implementations the processing device may be implemented on a computing resources, e.g., a blade server or the like.

In some implementations a connection server manages connections between the client computing device(s) and the server(s) hosting the application(s). Connection servers which provide meaningful information about the status of connections between a client computing device and a server, or an application executing thereon, would find utility.

DETAILED DESCRIPTION

Described herein are exemplary systems and methods which may be used to implement connection broker assignment status reporting in a remote computing system. In the following description, numerous specific details are set forth in order to provide a thorough understanding of various embodiments. However, it will be understood by those skilled in the art that the various embodiments may be practiced without the specific details. In other instances, well-known methods, procedures, components, and circuits have not been described in detail so as not to obscure the particular embodiments.

Figure 1:
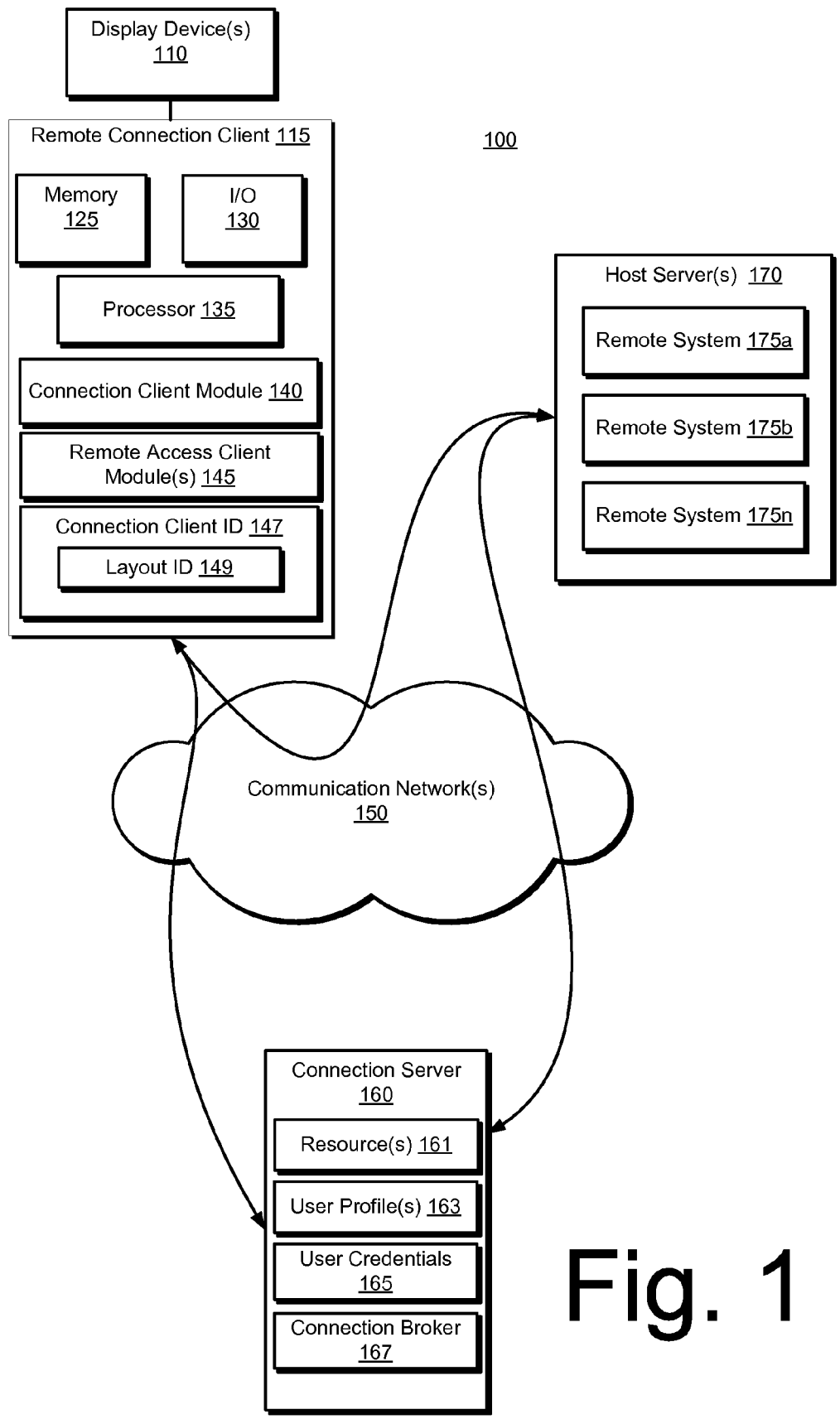
FIG. 1 is a schematic illustration of a connection management system computing environment in which a connection broker may be implemented, according to embodiments.

FIG. 1 is a schematic illustration of remote computing system environment 100, according to embodiments. The networked computing environment 100 is intended to illustrate a client-server network configuration, and may represent a computing environment that spans a corporate or college campus, a city, or an entire geographic region.

Computing environment 100 comprises a remote connection client 115, a connection server 160, and at least one host server 170 communicatively coupled by at least one communication network 150. In the embodiment depicted in FIG. 1, connection server 160 comprises resources 161 such as, e.g., applications, storage, or other resources. In some embodiments, connection server 160 may comprise at least one user profile 163, and at least one user credentials 165. By way of example and not limitation, a user profile 163 is presented in FIG. 5 and discussed in more depth below. Servers 160 and 170 need not be centrally located. Servers 160 and 170 may be physically remote from one another and maintained separately.

In some embodiments, a remote connection client 115 may comprise a memory module 125, an input/output module 130, a processor 135, a connection client module 140, a remote access client module 145, and a connection client identifier 147. In some embodiments, the connection client identifier 147 may comprise among other components a layout identifier 149. Furthermore, the remote connection client 115 may be coupled to at least one display device 110. At least one remote connection client 115 may communicate with connection server 160 via a communication network 150. Each remote connection client 115 in the computing environment 100 may be implemented as a fully functional client computer, or as a thin client computing device as depicted in FIG. 1.

Thin client computing devices have become more popular among IT organizations. Compared to fully functional client computers, thin client computing devices may have only a relatively small amount of system memory 125 and a relatively slow processor 135. In some embodiments, the processor 135 may be a graphics processor. Thin clients provide several advantages over fully functional client computers. For example, thin clients may be more reliable than their fully functional client computers, which in turn may reduce maintenance costs.

The number of remote connection clients 115 may be related to the computing power of the servers 160, 170. If the servers have a high degree of computing power (for example, fast processor(s) and/or a large amount of system memory) then they will be able to effectively serve a relatively large number of client computers.

In some embodiments, a connection client module 140 may comprise software to run on a remote connection client 115. The connection client module 140 may communicate with a connection server 160 and receive a list of remote systems 175a, 175b . . . 175n with which the remote connection client 115 may connect. Furthermore, a connection client module 140 may create connections with the remote systems 175a, 175b . . . 175n by controlling various remote access client modules 145.

In some embodiments, a remote access client module 145 may comprise software to run on a remote connection client 115. The remote access client module 145 may allow a computing system to communicate with a remote system by managing connection properties and parameters.

Remote connection client 115 and servers 160 and 170 are connected to a communication network 150. These connections may be implemented as a Personal Area Network (PAN), Local Area Network (LAN), Metropolitan Area Network (MAN), a Wide Area Network (WAN) or the like. Furthermore, communication network 150 may comprise one or more sub-networks. By way of example, and not by limitation, communication network 150 may comprise one or more wireless access points (WAPs) that establish a wireless network, which is coupled to a LAN or directly to a backbone network such as the Internet. Additionally, the communication network 150 may include a variety of input/output transports such as, but not limited to wired USB or serial links, Wireless 802.11x link, wireless USB, Blue-tooth, infra red link or the like.

In some embodiments, connection server 160 may contain among other resources, at least one user profile 163 and at least one user credentials 165. By way of example and not limitation, a user profile is presented in FIG. 5 and is discussed in more depth below. In addition, connection server 160 comprises at least one connection broker module 167.

In some embodiments, a host server 170 may comprise at least one remote system 175a, 175b . . . 175n. In some embodiments, the remote systems 175a, 175b . . . 175n may comprise blades coupled to the host server 170.

In operation, a user may elect to connect via the client connection module 140 to one or more remote systems 175a, 175b . . . 175n. The connection client module 140 may prompt the user for their username/credentials. The connection client module 140 may send a request to the connection server 160 along with the user's credentials. The connection server 160 may determine if the user has one or more profiles 163. If the user has one profile 163, the connection server 160 may determine the remote systems 175a, 175b . . . 175n that the user can connect to and the properties/policies that should be used for each connection. If systems are dynamically assigned an available remote system may be determined out of a pool of remote systems 175a, 175b . . . 175n. If remote systems 175a, 175b . . . 175n are statically assigned to a user, those remote systems 175a, 175b . . . 175n may be returned. The properties also may include information on what remote access client module 145 to use for each connection and potentially the window position, width, and height for each connection as well as any other properties/settings that can be specified in the remote access client, such as "IsUsbEnabled". The connection server 160 may send this information back to the connection client module 140. The connection client module 140 may then start up the specified remote access client modules 145 and initiate connections to each remote system using the supplied properties.

By way of example and not limitation, the above discussed remote connection client 115 may allow a user to connect to multiple remote systems contemporaneously and may allow the simultaneous use of multiple remote access modules 145. Furthermore, properties for each connection may be individually applied for each connection. In some embodiments, a connection may be routed through a connection server 160. In some embodiments, a connection between a remote system and computing system may be established across a communication network 150.

Figure 2:
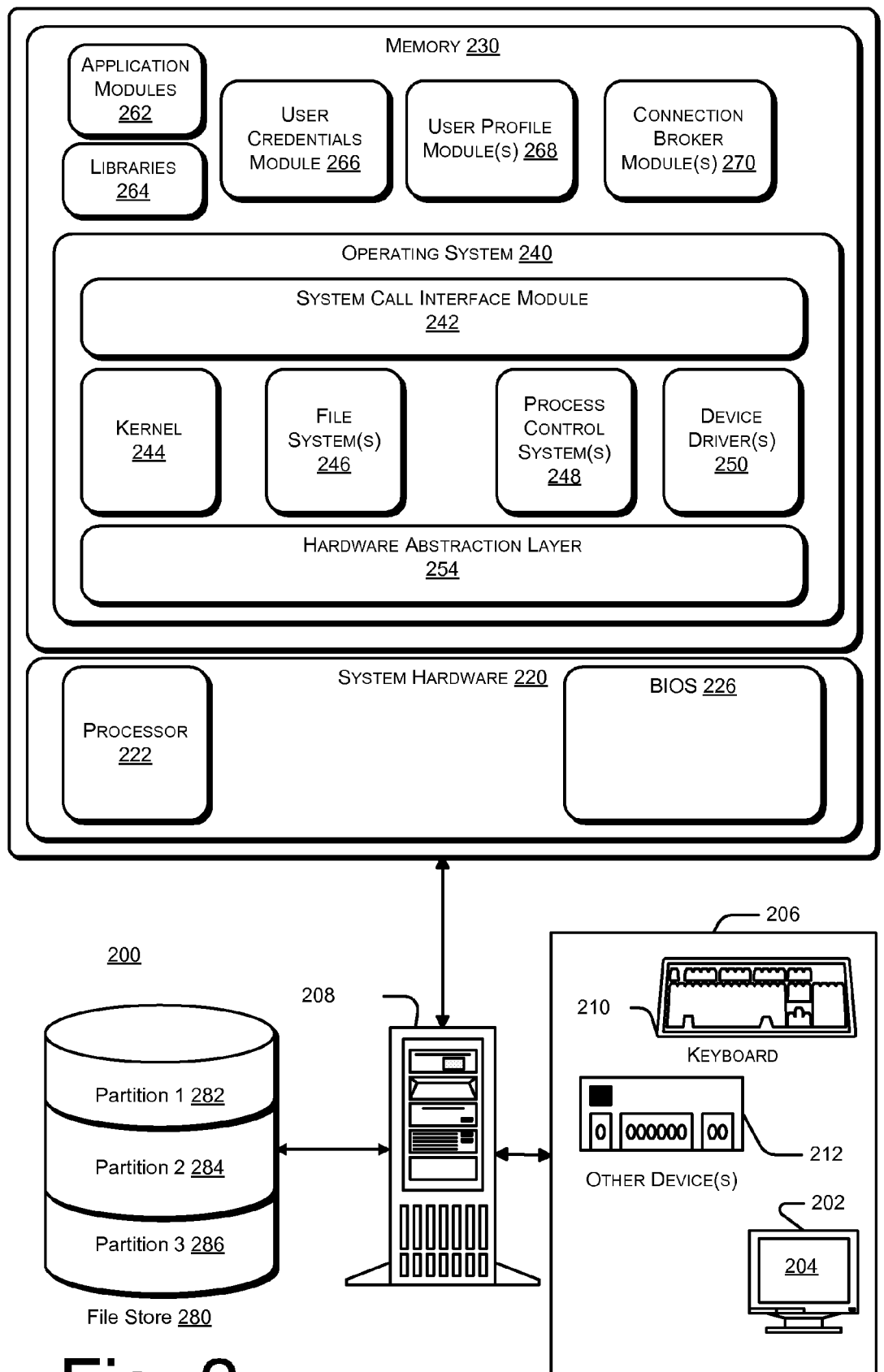
FIG. 2 is a schematic illustration of a connection server, according to embodiments.

FIG. 2 is a schematic illustration of a connection server 200 adapted to implement connection broker assignment status reporting, according to embodiments. The connection sever 200 includes a computing engine 208 and possibly one or more accompanying input/output devices 206 including, but not limited to, a display 202 having a screen 204, a keyboard 210, and other I/O device(s) 212. The other device(s) 212 may, by way of example, and not by limitation, include a touch screen, a voice-activated input device, a track ball, a mouse and any other device that allows the connection server 200 to receive input from a developer and/or a user.

The computing engine 208 includes system hardware 220 commonly implemented on a motherboard and at least one auxiliary circuit board. System hardware 220 includes a processor 222 and a basic input/output system (BIOS) 226. BIOS 226 may be implemented in flash memory and may comprise logic operations to boot the computing engine 208 and a power-on self-test (POST) module for performing system initialization and tests. In operation, when activation of computing engine 208 begins processor 222 accesses BIOS 226 and shadows the instructions of BIOS 226, such as power-on self-test module, into operating memory. Processor 222 then executes power-on self-test operations to implement POST processing.

Connection server 200 further includes a file store 280 communicatively connected to computing engine 208. File store 280 may be internal such as, e.g., one or more hard drives, or external such as, e.g., one or more external hard drives, network attached storage, or a separate storage network. In some embodiments, the file store 280 may include one or more partitions 282, 284, 286.

Memory 230 includes an operating system 240 for managing operations of computing engine 208. In one embodiment, operating system 240 includes a hardware abstraction layer 254 that provides an interface to system hardware 220. In addition, operating system 240 includes a kernel 244, one or more file systems 246 that manage files used in the operation of computing engine 208 and a process control subsystem 248 that manages processes executing on computing engine 208. Operating system 240 further includes one or more device drivers 250 and a system call interface module 242 that provides an interface between the operating system 240 and one or more application modules 262 and/or libraries 264. The various device drivers 250 interface with and generally control the hardware installed in the computing system 200.

In operation, one or more application modules 262 and/or libraries 264 executing on computing engine 208 make calls to the system call interface module 242 to execute one or more commands on the computer's processor. The system call interface module 242 invokes the services of the file systems 246 to manage the files required by the command(s) and the process control subsystem 248 to manage the process required by the command(s). The file system(s) 246 and the process control subsystem(s) 248, in turn, invoke the services of the hardware abstraction layer 254 to interface with the system hardware 220. The operating system kernel 244 can be generally considered as one or more software modules that are responsible for performing many operating system functions.

The particular embodiment of operating system 240 is not critical to the subject matter described herein. Operating system 240 may, for example, be embodied as a UNIX operating system or any derivative thereof (e.g., Linux, Solaris, etc.) or as a Windows® brand operating system or another operating system.

In some embodiments, connection server 200 may comprise at least one user credentials module 266 and at least one user profile module 268, which may comprise operational logic and may include or invoke hardware that can communicate with at least one remote device. In addition, connection server 200 comprises a connection broker module 270. Operations implemented using the user credentials module 266 and user profile module 268 will be discussed in greater detail below, with reference to FIG. 3, and operations implemented using the connection broker module 270 will be discussed with reference to FIG. 4.

In operation, a user on a remote connection client 115 may connect to a connection server 200. The user may provide credentials to authorize access to remote systems. These credentials may be checked against user credentials module 266 to determine if the user may be granted access. In some embodiments, user credentials may be stored remotely an accessed by another device such as an active directory service. Once a user has been authorized, a user may select from at least one user profile 268 stored on the connection server. Once a user has selected a user profile, the connection server 200 may send connection data to the user remote connection client 115. This connection data may allow the remote connection client 115 to access at least one remote system 175. In some embodiments, remote systems 175 may be blades in a host server 170.

Figure 3:
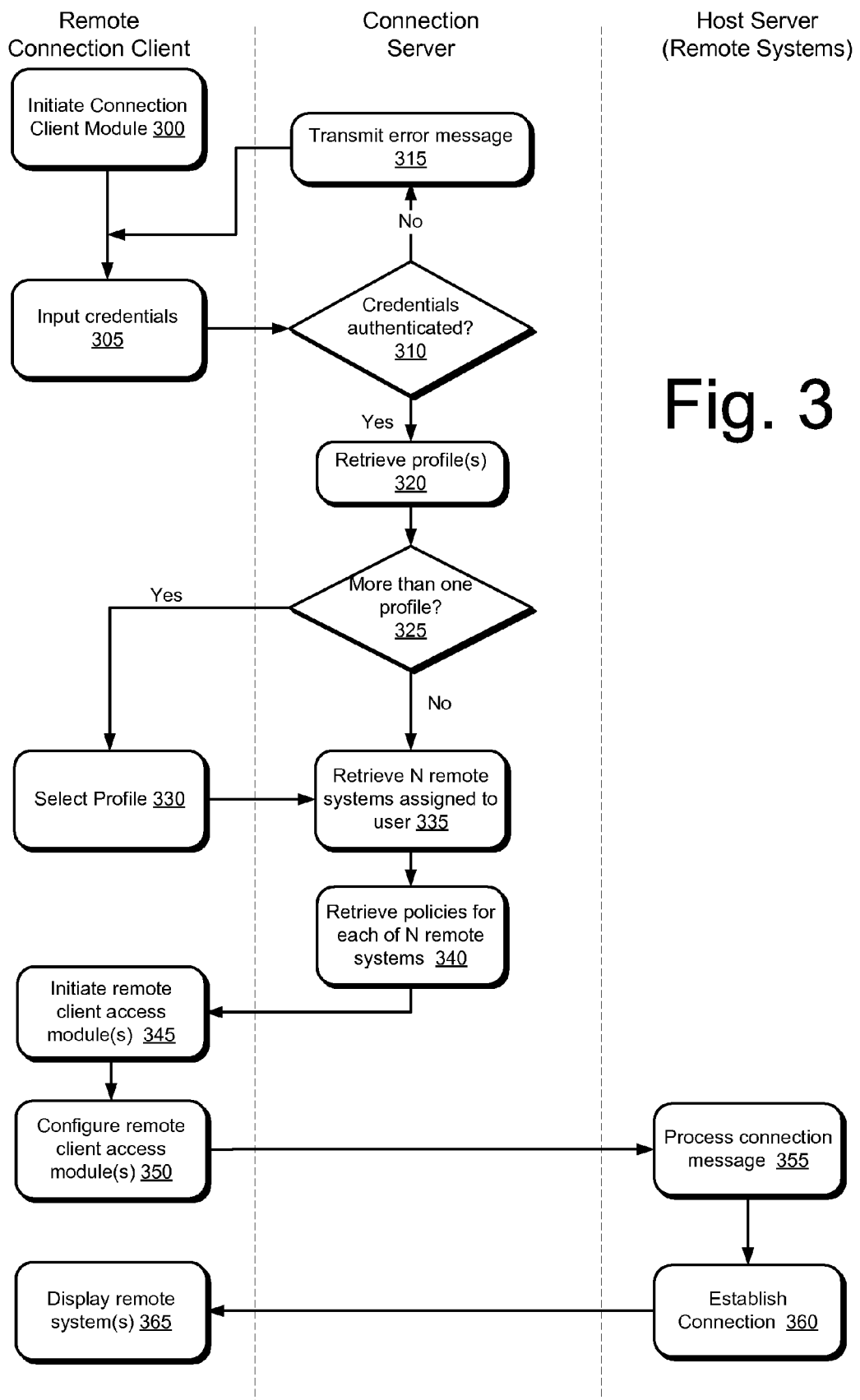
FIG. 3 is a flowchart illustrating operations implementing multiple connections through a connection management system to a connection client, according to embodiments.

FIG. 3 is a flowchart illustrating operations implementing multiple connections through a connection management system, according to embodiments. Referring to FIG. 3, at operation 300 a connection client module is initiated. In some embodiments, a connection client module 140 may run as software on a user computing system, such as a remote connection client 115 depicted in FIG. 1. In some embodiments, a user may initiate the connection client module 140. In some embodiments, the connection client module 140 may be initiated automatically during the computing device start up or the like. At operation 305, a user may input credentials. In some embodiments, the user credentials may be used to determine whether a user may gain access to remote systems. Once the user credentials have been inputted, the credentials are transmitted to a connection server, such as the connection server 160 depicted in FIG. 1.

At operation 310, a connection server 160 authenticates the inputted user credentials. If at operation 310, the user credentials are insufficient, at operation 315 an error message is transmitted to inform the user that access has not been granted. By contrast, if at operation 310 the user credentials are sufficient then at connection, the connection server retrieves at least one user profile at operation 320.

If at operation 325, the connection server 160 has retrieved more than one user profile then a list of the retrieved user profiles is transmitted to the remote connection client 115. At operation 330, a user profile is selected and transmitted to the connection server 160.

By contrast, if at operation 325, the connection server 160 retrieves only one profile, then the connection server 160 retrieves connection data for the known number of remote systems assigned to the retrieved user profile at operation 335. In some embodiments, if a user has not created or been assigned a specific profile, a default profile may be transmitted to the computing device. An example of information stored in a user profile is presented in FIG. 5 and is discussed below.

At operation 335, the number of remote systems assigned to the user is determined. In some embodiments, remote systems may be statically assigned, while in other embodiments remote systems may be dynamically assigned. If systems are dynamically assigned at least one available remote system may be determined out of a pool of remote systems. If remote systems are statically assigned to a user, those remote systems may be returned.

At operation 340, the policies of at least one remote system are determined. Policies also may include information on what remote access client module to use for each connection and potentially the window position, width, and height for each connection as well as any other properties/settings that can be specified in the remote access client, such as "IsUsbEnabled". The number of available remote systems and their associated policies are communicated to the remote connection client 115.

At operation 345, at least one remote client access module is initiated. In some embodiments, different remote systems may use different remote client access modules.

At operation 350, remote client access module configures the remote connection client 115 to connect to at least one remote system. In some embodiments, the connection client module may start up the specified remote access client modules and initiate connections to each remote system using the supplied properties and policies.

At operation 355, at least one remote system receives connection data from at least one remote access client module. In some embodiments, the connection data may be transmitted through a connection server. In some embodiments, a connection between a remote system and computing system may be established across a communication network. At operation 360, a connection is established with at least one remote system.

At operation 365, at least one remote system is displayed on a user computing system by the remote access client. In some embodiments, the user profile determines display characteristics and the like for the remote system of the user computing device.

Figure 4:
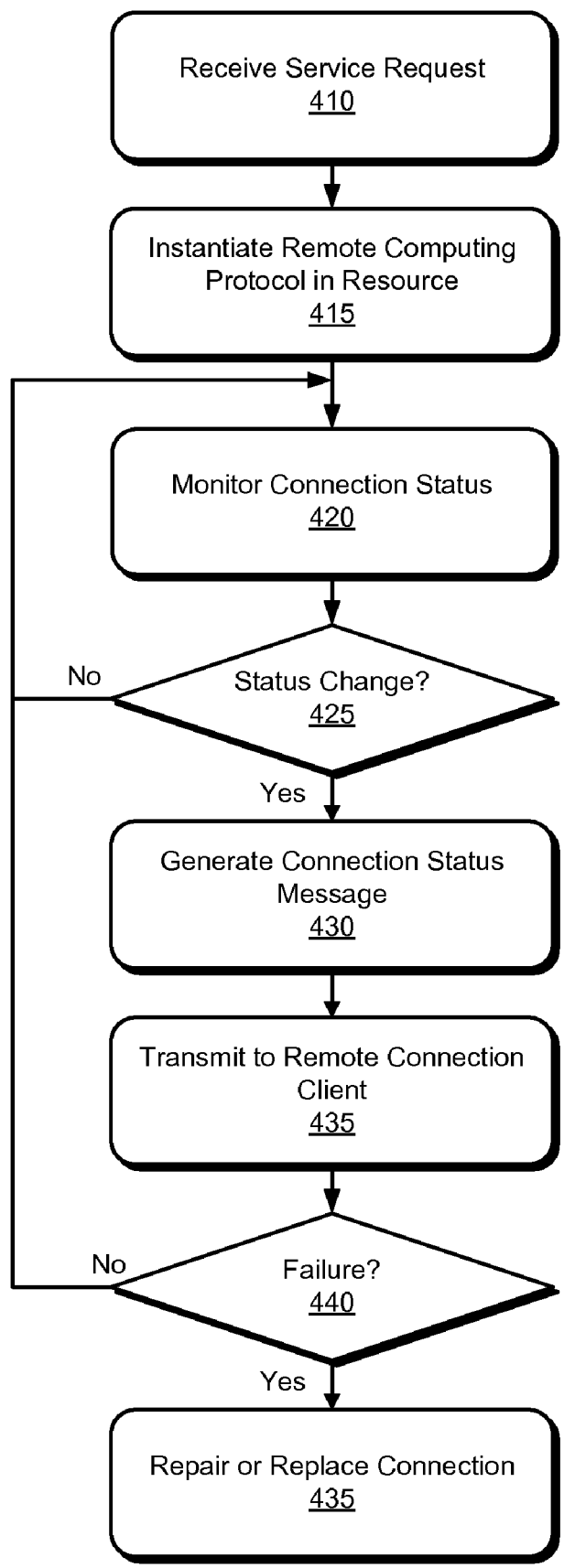
FIG. 4 is a flowchart illustrating operations implementing multiple connections through a connection management system, according to embodiments.

FIG. 4 is a flowchart illustrating operations implementing connection broker assignment status reporting, according to embodiments. Referring to FIG. 4, at operation 410, a service request is received in the connection broker module 270. In some embodiments, the service request may correspond to a request to initiate a connection to a resource. User credentials may be received from a computing device and have been inputted by a user. In operation, user credentials may include a user identifier, a user name or the like.

At operation 415 the connection broker module 270 instantiates a remote computing protocol on a computing resource, and at operation 420 the connection broker module 270 monitors the status of the connection between the remote connection client 115 and the remote system 175. If, at operation 425, there is no change in the status of the connection, then the connection broker module 270 continues to monitor the connection status.

By contrast, if at operation 425 there is a change in the status of the connection, then at operation 430 the connection broker module 270 generates a connection status message, and at operation 435 the connection status message is transmitted to the remote connection client 115. In some embodiments the connection status message comprises information relating to the type of status change (i.e., an authentication failure, an authorization failure, software fault, a network fault, or another hardware fault). In some embodiments, status changes may be determined on the client. For example a lost connection due to a network failure may be determined by the client, e.g., if the network failure also took down the connection to the broker. Messages about connection status therefore may be determined either locally from the client or from the connection broker monitoring the status.

If, at operation 440, the status change is not a connection failure, then control passes back to operation 440 and the connection broker module 270 continues to monitor the connection status. By contrast, if at operation 440 the status change is a status failure, then the connection broker module 270 may implement operations to repair or replace the connection. By way of example, if the connection cannot be repaired, then the connection broker module 270 may implement operations to provision a replacement remote system on a separate server.

Thus, described herein are exemplary system and methods for implementing connection broker assignment status reporting. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method for remote connection client display layout management, comprising:
   receiving, in a connection server, a service request from a user via a remote connection client, the service request related to a computing resource different from the remote connection client and the connection server;
   in response to receiving the service request, instantiating a remote computing protocol in the computing resource by the connection server;
   monitoring a connection state between the remote connection client and the computing resource; and
   in response to a change in the connection state between the remote connection client and the computing resource:
      generating a connection state message; and
      transferring the connection state message to the remote connection client.

2. The method of claim 1, wherein the service request is initiated in the remote connection client by:
   initiating a connection client module;
   prompting a user to input credentials;
   receiving the user credentials; and
   transmitting, from the computing device, user credentials and a connection client identifier comprising a layout identifier to the connection server.

3. The method of claim 1, further comprising:
   determining whether the connection state change corresponds to a connection failure; and
   in response to a connection failure:
      collecting fault information relating to the connection failure; and
      transmitting the fault information with the connection state message.

4. The method of claim 3, wherein the connection failure comprises at least one of an authentication failure, an authorization failure, a software fault, a network fault, or a hardware fault.

5. The method of claim 1, further comprising:
   determining whether the connection state change corresponds to a connection failure; and
   in response to a connection failure, presenting, on a user interface, an option for a user to repair the connection.

6. The method of claim 1, further comprising:
   determining whether the connection state change corresponds to a connection failure; and
   in response to a connection failure, initiating a connection with the application on a back-up resource.

7. A computing system comprising:
   one or more processors;
   a display device coupled to the computing system; and
   a memory module communicatively connected to the one or more processors and comprising logic to:
   receive, in a connection server, a service request from a user via a remote connection client, the service request related to a computing resource different from the remote connection client and the connection server;
   in response to the service request, instantiate a remote computing protocol in the computing resource, by the connection server;
   monitor a connection state between the remote connection client and the computing resource; and
   in response to a change in the connection state between the remote connection client and the computing resource:
   generate a connection state message; and
   transfer the connection state message to the remote connection client.

8. The computing system of claim 7, wherein the service request is initiated in the remote connection client by logic to:
   initiate a connection client module;
   prompt a user to input credentials;
   receive the user credentials; and
   transmit, from the computing device, user credentials and a connection client identifier comprising a layout identifier to the connection server.

9. The computing system of claim 7, further comprising logic to:
   determine whether the connection state change corresponds to a connection failure; and
   in response to a connection failure:
      collect fault information relating to the connection failure; and
      transmit the fault information with the connection state message.

10. The computing system of claim 9, wherein the connection failure comprises at least one of an authentication failure, an authorization failure, a software fault, a network fault, or a hardware fault.

11. The computing system of claim 7, further comprising logic to:
    determine whether the connection state change corresponds to a connection failure; and
    in response to a connection failure, present, on a user interface, an option for a user to repair the connection.

12. The computing system of claim 7, further comprising logic to:
    determine whether the connection state change corresponds to a connection failure; and
    in response to a connection failure, initiate a connection with the application on a back-up resource.

13. A computer program product comprising logic instructions stored on a non-transitory computer-readable medium which, when executed by a computer processor, configures the processor to:
    receive, in a connection server, a service request from a user via a remote connection client, the service request related to a computing resource different from the remote connection and the connection server;
    in response to the service request, instantiate a remote computing protocol in the computing resource, by the connection server;
    monitor a connection state between the remote connection client and the computing resource; and
    in response to a change in the connection state between the remote connection client and the computing resource:
    generate a connection state message; and
    transfer the connection state message to the remote connection client.

14. The computer program product of claim 13, further comprising logic instructions which, when executed on the processor, configures the processor to:
    initiate a connection client module
    prompt a user to input credentials;
    receive the user credentials; and
    transmit, from the computing device, user credentials and a connection client identifier comprising a layout identifier to the connection server.

15. The computer program product of claim 13, further comprising logic instructions which, when executed on the processor, configures the processor to:
    determine whether the connection state change corresponds to a connection failure; and in response to a connection failure:
collect fault information relating to the connection failure; and
transmit the fault information with the connection state message.

16. The computing program product of claim 15, wherein the connection failure comprises at least one of an authentication failure, an authorization failure, a software fault, a network fault, or a hardware fault.

17. The computer program product of claim 15, further comprising logic instructions which, when executed on the processor, configures the processor to:
determine whether the connection state change corresponds to a connection failure; and
in response to a connection failure, present, on a user interface, an option for a user to repair the connection.

18. The computer program product of claim 15, further comprising logic instructions which, when executed on the processor, configures the processor to:
determine whether the connection state change corresponds to a connection failure; and
in response to a connection failure, initiate a connection with the application on a back-up resource.

* * * * *

UNITED STATES PATENT AND TRADEMARK OFFICE
CERTIFICATE OF CORRECTION

PATENT NO. : 8,250,413 B2
APPLICATION NO. : 12/242091
DATED : August 21, 2012
INVENTOR(S) : Byron A. Alcorn et al.

Page 1 of 1

It is certified that error appears in the above-identified patent and that said Letters Patent is hereby corrected as shown below:

In column 9, line 7, in Claim 16, delete "computing" and insert -- computer --, therefor.

Signed and Sealed this
Nineteenth Day of February, 2013

Teresa Stanek Rea
*Acting Director of the United States Patent and Trademark Office*